United States Patent
Laroche et al.

(10) Patent No.: US 9,708,557 B2
(45) Date of Patent: *Jul. 18, 2017

(54) PROCESS FOR THE TREATMENT OF LIQUEFIED HYDROCARBON GAS USING 2-AMINO-2(HYDROXYMETHYL) PROPANE-1,3-DIOL COMPOUNDS

(71) Applicant: Dow Global Technologies LLC, Midland, MI (US)

(72) Inventors: Christophe R. Laroche, Lake Jackson, TX (US); James M. Hill, Lake Jackson, TX (US)

(73) Assignee: DOW GLOBAL TECHNOLOGIES LLC, Midland, MI (US)

( * ) Notice: Subject to any disclaimer, the term of this patent is extended or adjusted under 35 U.S.C. 154(b) by 18 days.

This patent is subject to a terminal disclaimer.

(21) Appl. No.: 14/399,814
(22) PCT Filed: Jun. 11, 2013
(86) PCT No.: PCT/US2013/045128
§ 371 (c)(1),
(2) Date: Nov. 7, 2014
(87) PCT Pub. No.: WO2013/188367
PCT Pub. Date: Dec. 19, 2013

(65) Prior Publication Data
US 2015/0112113 A1 Apr. 23, 2015

Related U.S. Application Data
(60) Provisional application No. 61/660,184, filed on Jun. 15, 2012.

(51) Int. Cl.
*C10G 21/27* (2006.01)
*C10G 21/16* (2006.01)
(Continued)

(52) U.S. Cl.
CPC .............. *C10L 3/12* (2013.01); *C10G 21/20* (2013.01); *C10G 29/20* (2013.01); *C10L 3/102* (2013.01);
(Continued)

(58) Field of Classification Search
None
See application file for complete search history.

(56) References Cited

U.S. PATENT DOCUMENTS

| 4,485,007 A | 11/1984 | Tam et al. |
| 5,688,478 A * | 11/1997 | Pounds .............. B01D 53/1493 423/228 |

(Continued)

FOREIGN PATENT DOCUMENTS

| CN | 101519188 | 9/2009 |
| EA | 200601957 A1 | 2/2007 |

(Continued)

OTHER PUBLICATIONS

Bougie et al., "CO2 Absorption into Mixed Aqueous Solutions of 2-Amino-2-hydroxymethyl-1,3-propanediol and Piperazine", Ind. Eng. Chem. Res., 2010, vol. 49, pp. 1150-1159.

*Primary Examiner* — Daniel Berns
(74) *Attorney, Agent, or Firm* — Akerman LLP

(57) ABSTRACT

A method for treating liquefied hydrocarbons comprising acid gases to remove said gases while minimizing loss of amine species, the method comprising the step of contacting the liquefied hydrocarbons with an absorbent aqueous solution of a first amine compound, the first amine compound having the structure:

(Continued)

wherein $R_1$ and $R_2$ may each individually be hydrogen, methyl, ethyl, n-propyl, i-propyl, n-butyl, s-butyl, 2-hydroxyethyl or propane-2,3-diol.

10 Claims, 1 Drawing Sheet

(51) Int. Cl.
    *C10G 21/20*    (2006.01)
    *C10G 29/20*    (2006.01)
    *C10L 3/10*    (2006.01)
    *C10L 3/12*    (2006.01)
    *C07C 31/22*    (2006.01)

(52) U.S. Cl.
    CPC ............... *C10L 3/103* (2013.01); *C10L 3/104* (2013.01); *C10L 2290/541* (2013.01)

(56) References Cited

U.S. PATENT DOCUMENTS

| | | |
|---|---|---|
| 5,877,386 A | 3/1999 | Schubert |
| 7,152,431 B2 | 12/2006 | Amin et al. |
| 7,276,153 B2 | 10/2007 | Wagner et al. |
| 7,998,714 B2 | 8/2011 | Gellett et al. |
| 8,597,418 B2 | 12/2013 | Inoue et al. |
| 8,697,428 B2 | 4/2014 | Borchert et al. |
| 2010/0047866 A1* | 2/2010 | Borchert ................ B01D 53/84 435/69.1 |
| 2010/0168496 A1* | 7/2010 | Viloria ............... B01D 53/1493 585/830 |
| 2015/0126793 A1* | 5/2015 | Laroche ................ C10G 21/20 585/860 |
| 2015/0141731 A1* | 5/2015 | Laroche ................ C10G 21/20 585/860 |

FOREIGN PATENT DOCUMENTS

| | | |
|---|---|---|
| EA | 0000013794 | 6/2010 |
| EP | 0405719 | 1/1991 |
| EP | 0558019 A2 | 2/1993 |
| JP | S59-004686 | 1/1984 |
| JP | 2003-535209 | 11/2003 |
| JP | 2010-517533 | 6/2010 |
| RU | 2446861 | 6/2008 |
| RU | 2408664 | 1/2011 |
| SU | 326765 | 1/1972 |
| WO | 2006120223 | 11/2006 |
| WO | 2007005979 | 1/2007 |
| WO | 2010126657 A1 | 11/2010 |
| WO | PCT/US2013/045128 | 6/2013 |
| WO | 2013/188361 | 12/2013 |
| WO | 2013/188375 | 12/2013 |

* cited by examiner

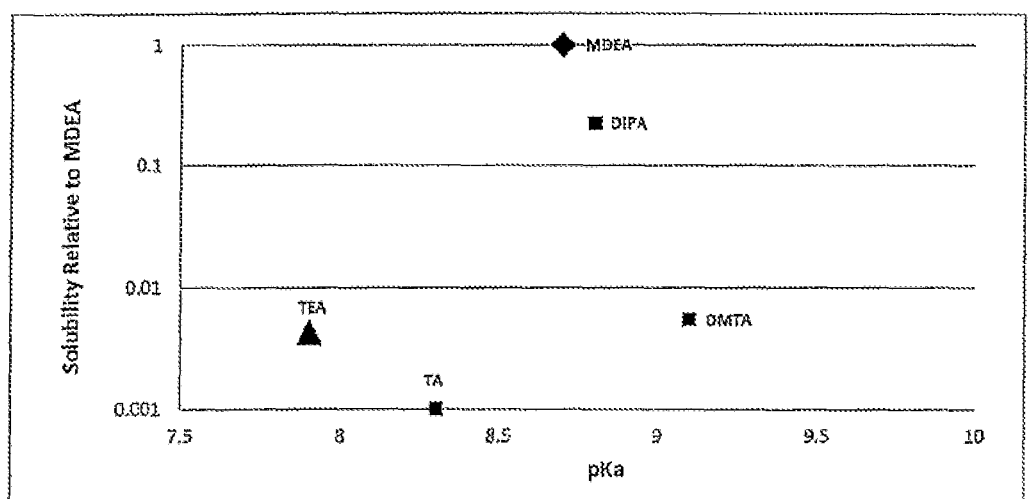

PROCESS FOR THE TREATMENT OF LIQUEFIED HYDROCARBON GAS USING 2-AMINO-2(HYDROXYMETHYL) PROPANE-1,3-DIOL COMPOUNDS

FIELD OF THE INVENTION

The invention relates generally to processes for the treatment of liquefied hydrocarbons. More specifically, the invention relates to processes for removing acid gases from liquefied hydrocarbon gas streams using 2-amino-2-(hydroxymethyl)propane-1,3-diol compounds.

BACKGROUND OF INVENTION

Liquefied hydrocarbons such as natural gas liquids (NGL) or liquid petroleum gas (LPG) are a flammable mixture of hydrocarbon gases used as a fuel in heating appliances and vehicles. They are also increasingly used as an aerosol propellant and a refrigerant, replacing chlorofluorocarbons in an effort to reduce damage to the ozone layer.

Liquefied hydrocarbons are synthesized by refining petroleum or "wet" natural gas, and are almost entirely derived from fossil fuel sources, being manufactured during the refining of petroleum (crude oil), or extracted from petroleum or natural gas streams as they emerge from the ground.

Liquefied hydrocarbon gases may evaporate quickly at normal temperatures and pressures and are usually supplied in pressurized steel gas cylinders. These cylinders are typically filled to between 80% and 85% of their capacity to allow for thermal expansion of the contained liquid. The ratio between the volumes of the vaporized gas and the liquefied gas varies depending on composition, pressure, and temperature, but is typically around 250:1.

The liquefied hydrocarbon gases often contain a variety of acidic, gaseous contaminants, such as hydrogen sulfide, a variety of mercaptans and other diverse sulfur compounds, carbon dioxide, and carbonyl sulfide (COS). It is well known in the gas treating industry that such contaminants can be successfully removed by contacting gas or liquid hydrocarbon streams with aqueous solutions of one or more amines. Aqueous amine solutions may be either selective or non-selective in their ability to absorb particular acid gases.

After such absorption, the acidic compounds are stripped from the amines and the amines are returned to the system, except to the extent the amine compounds may have been lost in the process. It has been theorized that many different amines would provide some level of utility for removal of acid gases. As a practical matter, the amines actually in commercial use are monoethanolamine (MEA), diethanolamine (DEA), methyldiethanolamine (MDEA), and diisopropanolamine (DIPA). For example, use of MDEA/DIPA mixtures has been reported (U.S. Pat. No. 4,808,765) for the purpose of removing $H_2S$.

Treatment of liquefied hydrocarbon gases presents particular problems in that amines tend to be significantly soluble in gases, leading to a corresponding economic penalty due to the need to make up the lost amine(s). Many refineries use aqueous DIPA or MDEA to remove the acidic impurities from liquefied hydrocarbon gases. However, the concentration of these amines is typically limited to the range of about 2-35 weight percent of the aqueous stream in which they are supplied to the process. Operation at higher concentrations, which is desirable for capacity reasons, generally results in undesirably high levels of liquefied hydrocarbon gas contamination with amine(s).

The problem is particularly acute at refineries treating cracked (i.e., highly unsaturated) LPG. Often, the loss rate of MDEA is sufficient to negate the economic justification for substituting MDEA for DEA.

All of U.S. Pat. Nos. 5,326,385; 5,877,386; and 6,344,949 teach some type of "sweetening" of liquefied hydrocarbon gas through various processes. Further, U.S. Pat. No. 4,959,086 uses isomers of amine compounds to remove hydrogen sulfide from natural gas. Use of MDEA/DIPA mixtures has been reported (U.S. Pat. No. 4,808,765) for the purpose of removing $H_2S$.

These publications present reasonable solutions to problems encountered when "sweetening" liquefied hydrocarbon gas through amine-acid gas processes. However, it would be highly desirable to have an amine composition which maximizes the effective amine concentration circulating in the liquefied hydrocarbon gas system, while yet minimizes the amount of amine(s) lost due to solubility in the liquefied hydrocarbon gas.

SUMMARY OF THE INVENTION

In accordance with one aspect of the invention, there is provided a method for treating liquefied hydrocarbons comprising acid gases to remove the acid gases while minimizing loss of amine species. The method comprises the step of contacting the liquefied hydrocarbons with an absorbent aqueous solution of a first amine compound, the first amine compound having the structure:

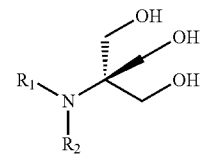

wherein $R_1$ and $R_2$ may each individually be hydrogen, methyl, ethyl, n-propyl, i-propyl, n-butyl, s-butyl, 2-hydroxy-ethyl or propane-2,3-diol.

When aqueous solutions of traditional alkanolamines such as methyldiethanolamine (MDEA) are used to treat liquefied petroleum gas within liquid/liquid processes, important amine loses can be encountered over time. The presence of hydroxyl groups has proved to be critical in reducing these losses by improving the lipophobic character of the molecule. Therefore, triethanolamine (TEA), incorporating three hydroxyl groups, remains the molecule of choice even though aqueous solutions of MDEA proved to be superior to aqueous solutions of TEA in terms of performance and capacity for acid gas removal. The difference in performance and capacity between MDEA and TEA is mainly dictated by the difference in basic strength reflected by their respective pKa of 8.7 for MDEA and 7.9 for TEA.

Therefore, alkanolamine structures incorporating an increased number of hydroxyl groups and/or nitrogen-hydrogen bonds compared to MDEA while maintaining a low molecular weight along with a basic strength (i.e. pKa) equal or superior to TEA would be ideal candidates for treating liquefied petroleum gas within liquid/liquid processes.

The incorporation of a 2-(hydroxymethyl)propane-1,3-diol moiety into alkanolamine structures allows for reduced stability in hydrocarbon streams compared to equivalent alkanolamine structures incorporating a 2-hydroxyethyl moiety (i.e. traditional ethoxylated alkanolamines). The basic strength of amine incorporating further hydroxyl groups is not altered compared to traditional ethoxylated alkanolamines since inductive effects engendered by the presence of more than one hydroxyl group on the same substituent of nitrogen do not cumulate.

For purposes of this disclosure, liquefied hydrocarbons are those low molecular weight hydrocarbons which may be saturated or unsaturated, branched or unbranched ranging in size from about, $C_1$ to $C_{20}$, preferably from about $C_1$ to $C_{12}$, more preferably from about $C_2$ to $C_6$ such as for example, LPG or NGL, or mixtures thereof.

BRIEF DESCRIPTION OF THE FIGURES

FIG. 1 is a graphical illustration of the relative solubility of the tested amines compared to MDEA plotted against their pKa values.

DETAILED DESCRIPTION OF THE PREFERRED EMBODIMENTS

Generally, the invention is a method for treating liquefied hydrocarbons comprising the removal of acid gases while minimizing loss of amine species. The method comprises the step of contacting the liquefied hydrocarbons with an absorbent aqueous solution of a first amine compound, the first amine compound having the structure:

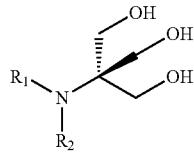

wherein $R_1$ and $R_2$ may each individually be hydrogen, methyl, ethyl, n-propyl, i-propyl, n-butyl, s-butyl, 2-hydroxyethyl or propane-2,3-diol.

Heretofore, amines commonly used in the prior art have relativity high solubility in liquid hydrocarbons. The invention addresses that problem by providing an amine compound with a lower gas solubility. These gases high solubility of prior art compositions of MDEA and DIPA is shown in FIG. 1.

Most refineries operate at a total amine concentration of no more than about 35 weight % of the amine-concentrating, aqueous treatment composition. Operation at about 40 weight %, preferably even about 50 weight % total amine(s) or more is desirable since high strength solutions provide additional acid gas removal capacity at low cost. Also, it is likely that the concentration of sulfur in crude oil will rise in the future.

Accordingly, in order to maintain or increase production, the refinery must, on the average, process/remove more sulfur. Nevertheless, because of the increased loss of amines at the higher concentrations, it has not been economically feasible to operate above about the 35% level in most cases. It is an advantage of the present invention that it allows the refinery to operate economically at higher total amine strengths without the high amine replacement costs they would otherwise incur.

The amine compound used in the method of the invention generally has the structure:

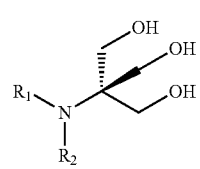

(1)

wherein $R_1$ and $R_2$ may each individually be hydrogen, methyl, ethyl, n-propyl, propyl, n-butyl, s-butyl, 2-hydroxyethyl or propane-2,3-diol.

Any number of pathways known to those of skill in the art may be used to synthesize compounds useful in the process of the invention such as those disclosed in the published PCT application No. WO2010/126657 which is incorporated herein by reference.

Compounds contemplated to be of use in the invention preferably include those found below such as 2-dimethylamino-2-(hydroxymethyl)propane-1,3-diol (DMTA, 2), 2-amino-2-(hydroxymethyl)propane-1,3-diol (TA, 3), 2-methylamino-2-(hydroxymethyl)propane-1,3-diol (MTA, 4), and mixtures thereof.

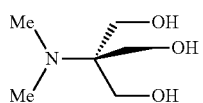

(2)

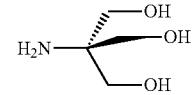

(3)

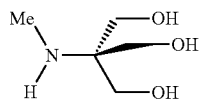

(4)

In addition to the first amine compound used in the process of the invention, the aqueous solution used to sweeten LPG may comprise a second amine compound. Amine compounds useful as the second amine compound include amine propanediol compounds such as 3-(2-(hydroxyethyl)methyl amino)propane-1,2-diol, 3-(methylamino)bis(propane-1,2-diol), amino-tris(propane-1,2-diol), 3-(methylamino)propane-1,2-diol, 3-(amino)propane-1,2-diol, 3-(amino)bis(propane-1,2-diol), or mixtures thereof; piperazine compounds such as 3-(piperazin-1-yl)propane-1,2-diol, 3,3'-(piperazin-1,4-diyl)bis(propane-1,2-diol), or mixtures thereof; alkyl amines such as monoethanolamine, diethanolamine, triethanolamine, methyldiethanolamine, diisopropananolamine, and mixtures thereof; and mixtures of compounds within each of these species heretofore listed above.

METHOD OF TREATMENT

The process of this invention may be readily implemented by contacting liquefied gas streams with the 2-amino-2-(hydroxymethyl)propane-1,3-diol compound mixtures in ordinary liquid-liquid contacting equipment, and under operating conditions within the ordinary limitations of such equipment. While some optimization of conditions, within the skill of the art, should preferably be done, it is to be expected that a reduction in amine solubility losses will be experienced even at existing operating conditions. A further advantage of the invention, therefore, is that it does not require significant substitutions or modifications in equipment, packing, operating conditions, and the like. Accordingly, the present invention is particularly beneficial to refineries which need more acid gas removal capacity, but are reluctant to pay for extensive capital upgrades.

It is another advantage of this invention that operating parameters are not narrowly critical. As a general guideline, it may be said that the higher the concentration in the system, the higher will be the amine losses. Representative concentrations are found below. While there is not known specific upper limit on concentration, it is suggested that the concentration be held to no more than about 95 weight % of the amine mixture, the remaining being water, in order to avoid operational problems, such as inadequate removal of $H_2S$. A useful approach to determining the maximum usable concentration of in a given system is to gradually increase the content until problems are detected, then back off on the concentration until such problems disappear.

Similarly, there is no necessary minimum concentration, this concentration may be a matter of routine experimentation. It is suggested, however, as a starting point that the concentration be at least about 5 weight %. It is believed that, in the majority of cases, the useful range of concentrations will be about 10 to about 90 weight %, preferably about 25 to about 75 weight %, and more preferably about 35 to about 65 weight % of the amine mixture, the remaining being water.

Additionally, the aqueous absorbant composition may also comprise an acid such as boric acid, sulfuric acid, hydrochloric acid, phosphoric acid, and mixtures thereof. The concentration of acid may vary in an amount effective from 0.1 to 25 weight % and most preferably from 0.1 to 12 weight %. The acid source is effective in recovering the amine compound once the acid gas has been stripped from the system.

The operating temperature for the contacting of the liquefied hydrocarbon gas with the containing amine mixture is not narrowly critical, but will usually be in the range of about 50° F. to about 190° F., preferably about 70° F. to about 160° F., and more preferably about 80° F. to about 140° F. In general terms, the lower temperatures are preferred in order to minimize solubility losses. Since most refineries do not have much flexibility in this regard, it is an advantage of this invention that significant reduction in amine loss will be effected at any given operating temperature.

WORKING EXAMPLES

The following examples provide a non-limiting illustration of the features of the invention.

A solution of heptane (10 g), toluene (0.1 g) and the tested amine (2.5 g) are mixed at 20° C. for 1 hour. The mixture is decanted for 15 minutes and the neat heptane phase is analyzed by gas chromatography using toluene as internal standard. The injection is repeated three times and peak areas of tested amine are averaged. Results are presented below:

| Amine | MDEA | TEA | DIPA | DMTA | TA |
|---|---|---|---|---|---|
| area counts | 9210 | 40 | 2082 | 50 | 0 |

The pKa of the tested amines was recorded using an automated Mettler Toledo titration system using 50 weight % aqueous amine solutions and 0.5 N hydrochloric acid. Results are presented below:

| Amine | MDEA | TEA | DIPA | DMTA | TA |
|---|---|---|---|---|---|
| pKa | 8.7 | 7.9 | 8.8 | 9.1 | 8.3 |

Although the present invention has been described by reference to its preferred embodiment as is disclosed in the specification and drawings above, many more embodiments of the present invention are possible without departing from the invention. Thus, the scope of the invention should be limited only by the appended claims.

The claimed invention is:

1. A method for treating liquefied hydrocarbons comprising acid gases to remove said acid gases while minimizing loss of amine species, said method comprising:
   contacting said liquefied hydrocarbons with an absorbent aqueous solution of a first amine compound, said first amine compound having the structure:

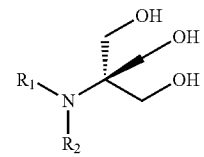

wherein $R_1$ and $R_2$ may each individually be hydrogen, methyl, ethyl, n-propyl, i-propyl, n-butyl, s-butyl, 2-hydroxyethyl, propane-2,3-diol, and mixtures thereof, and wherein said absorbent aqueous solution absorbs said acid gases from said liquefied hydrocarbons;
   stripping said acid gases from said absorbent aqueous solution, forming a regenerated absorbent aqueous solution; and
   repeating said contacting step with said regenerated absorbent aqueous solution.

2. The method of claim 1, wherein said absorbent aqueous solution comprises from about 0.1 weight % to 90 weight % of said first amine compound and additionally comprises from about 1 weight % to 90 weight % of a second amine compound.

3. The method of claim 1, wherein said absorbent aqueous solution comprises from about 0.1 weight % to 50 weight % of said first amine compound and additionally comprises from about 5 weight % to 50 weight % of a second amine compound.

4. The method of claim 1, wherein $R_1$ and $R_2$ are hydrogen.

5. The method of claim 1, wherein $R_1$ and $R_2$ are methyl.

6. The method of claim 1, wherein $R_1$ is hydrogen and $R_2$ is methyl.

7. The method of claim 1, wherein said acid gases comprise one or more gases selected from the group consisting of $CO_2$, $H_2S$, a mercaptan compound, COS, $CS_2$, and mixtures thereof.

8. The method of claim 1, wherein said aqueous solution comprises a second amine compound comprising a piperazine compound selected from the group consisting of piperazine, 2-methylpiperazine, 1-hydroxyethylpiperazine, 3-(piperazin-1-yl)propane-1,2-diol, 3,3'-(piperazin-1,4-diyl) bis(propane-1,2-diol) and mixtures thereof.

9. The method of claim 1, wherein said absorbent aqueous solution comprises a second amine compound comprising compound selected from the group consisting of triethanolamine, diethanolamine, methyldiethanolamine, diisopropanolamine, 3-(2-(hydroxyethyl)methylamino)propane-1,2-diol), 3-(methylamino)bis(propane-1,2-diol), amino-tris(propane-1,2-diol, 3-(methylamino)propane-1,2-diol, 3-(amino)propane-1,2-diol, 3-(amino)bis(propane-1,2-diol) and mixtures thereof.

10. The method of claim 1, wherein said absorbent aqueous solution comprises an acid, said acid selected from the group consisting of boric acid, hydrochloric acid, sulfuric acid, phosphoric acid and mixtures thereof.

* * * * *